(12) United States Patent
Warren-Smith et al.

(10) Patent No.: US 12,158,377 B2
(45) Date of Patent: Dec. 3, 2024

(54) MICROSTRUCTURED OPTICAL FIBER SENSOR

(71) Applicant: The University of Adelaide, Adelaide (AU)

(72) Inventors: Stephen Christopher Warren-Smith, Adelaide (AU); Heike Ebendorff-Heidepriem, Adelaide (AU); Viet Linh Nguyen, Adelaide (AU); Erik Peter Schartner, Adelaide (AU)

(73) Assignee: The University of Adelaide, Adelaide (AU)

( * ) Notice: Subject to any disclaimer, the term of this patent is extended or adjusted under 35 U.S.C. 154(b) by 308 days.

(21) Appl. No.: 17/767,244

(22) PCT Filed: Oct. 8, 2020

(86) PCT No.: PCT/AU2020/000118
§ 371 (c)(1),
(2) Date: Apr. 7, 2022

(87) PCT Pub. No.: WO2021/068024
PCT Pub. Date: Apr. 15, 2021

(65) Prior Publication Data
US 2022/0373408 A1 Nov. 24, 2022

(30) Foreign Application Priority Data
Oct. 8, 2019 (AU) ................................ 2019903789

(51) Int. Cl.
*G01K 11/3206* (2021.01)
*G02B 6/02* (2006.01)

(52) U.S. Cl.
CPC ...... *G01K 11/3206* (2013.01); *G02B 6/02176* (2013.01); *G02B 6/02366* (2013.01)

(58) Field of Classification Search
CPC ............ G01K 11/3206; G02B 6/02176; G02B 6/02366; G02B 6/022; G02B 6/02204;
(Continued)

(56) References Cited

U.S. PATENT DOCUMENTS 11,029,219 B2 * 6/2021 Monro ............... G01K 11/3206
2021/0348970 A1 * 11/2021 Roussel ................. G02B 6/021

FOREIGN PATENT DOCUMENTS

GB 2386434 A 9/2003
WO 2016112422 A1 7/2016

OTHER PUBLICATIONS

Ge et al., "Higher-Order Mode Suppression in Antiresonant Nodeless Hollow-Core Fibers", Micromachines, 2019, pp. 1-12, vol. 10:128.
(Continued)

*Primary Examiner* — John Bedtelyon
(74) *Attorney, Agent, or Firm* — The Webb Law Firm

(57) ABSTRACT

A microstructured optical fiber sensor for sensing changes in a physical characteristic up to a predetermined temperature is disclosed. The sensor includes a microstructured optical fiber and a fiber Bragg grating formed in the microstructured optical fiber by generating a periodic modulation in the refractive index along a core region of the suspended core. The fiber Bragg grating is configured to produce a band reflection spectra including a fundamental mode and a plurality of higher order modes whose respective wavelengths vary in accordance with changes in the physical characteristic at the core region of the microstructured optical fiber. The microstructured optical fiber is configured to increase the confinement loss of the plurality of higher order modes of the band reflection spectra relative to the fundamental mode.

24 Claims, 9 Drawing Sheets

(58) Field of Classification Search
CPC ............ G02B 6/02147; G02B 6/02042; G02B 6/02076; G02B 6/021; G02B 6/02295; G02B 6/02314; G01L 1/246
See application file for complete search history.

(56) References Cited

OTHER PUBLICATIONS

Grabka et al., "Experimental and Theoretical Study of Light Propagation in Suspended-Core Optical Fiber", Acta Physica Polonica A, 2010, pp. 1127-1132, vol. 118:6.

Liu et al., "Microstructured Optical Fiber Sensors", Journal of Lightwave Technology, Aug. 2017, pp. 3425-3439, vol. 35:16.

Warren-Smith et al., "Fabrication, splicing, Bragg grating writing, and polyelectrolyte functionalization of exposed-core microstructured optical fibers", Optics Express, Dec. 2014, pp. 29493-29504, vol. 22:24.

Warren-Smith et al., "Temperature sensing up to 1300 C using suspended-core microstructured optical fibers", Feb. 2016, pp. 3714-3719, vol. 24:4.

* cited by examiner

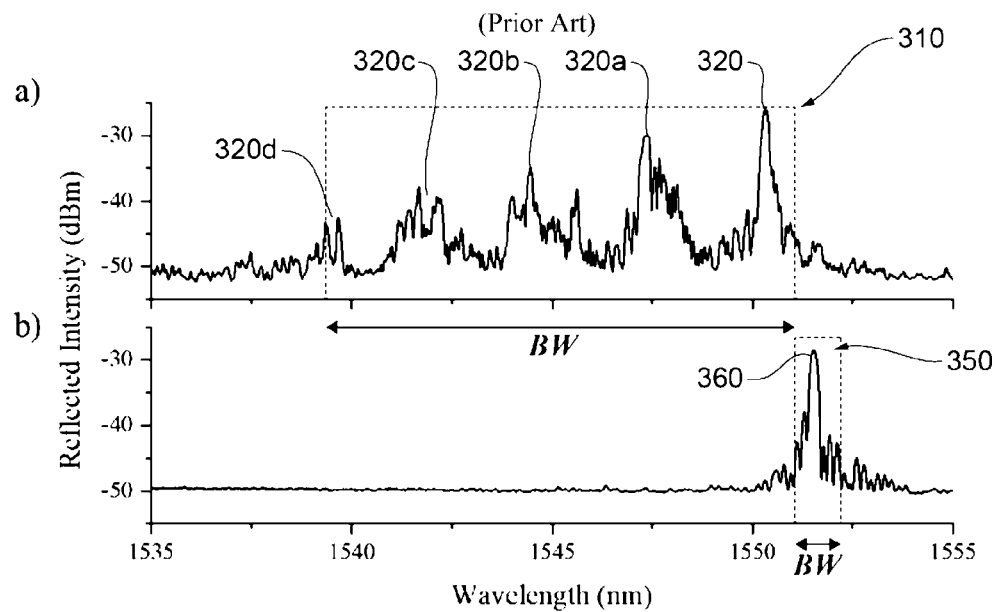
Figure 3
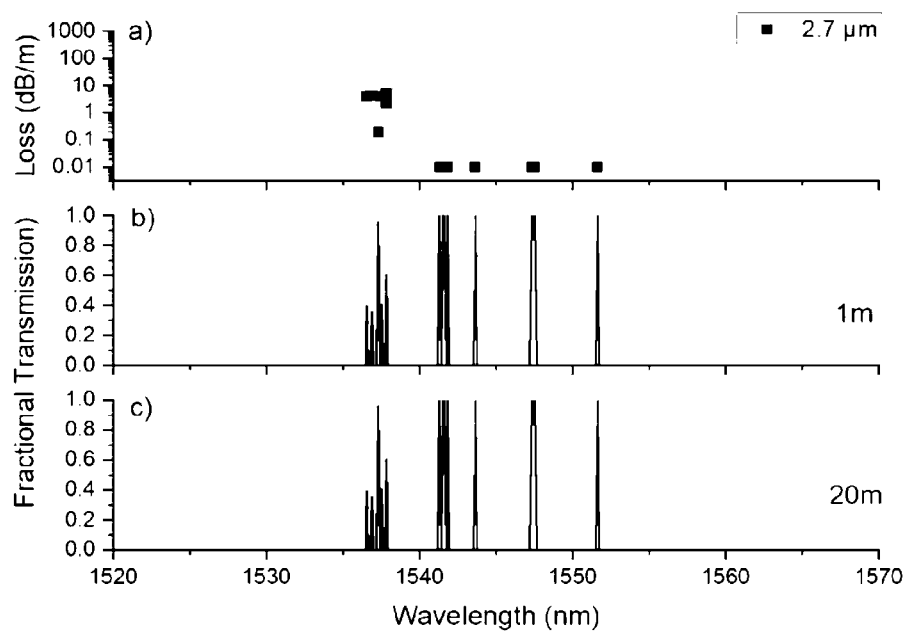
Figure 4a
Figure 4b
Figure 4c

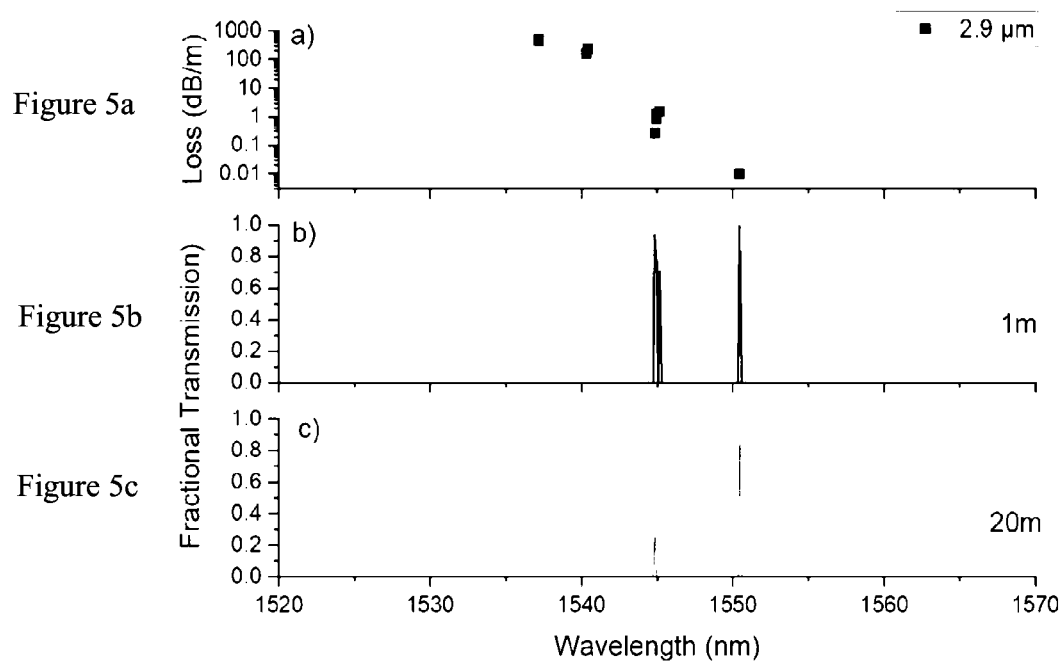
Figure 5a
Figure 5b
Figure 5c
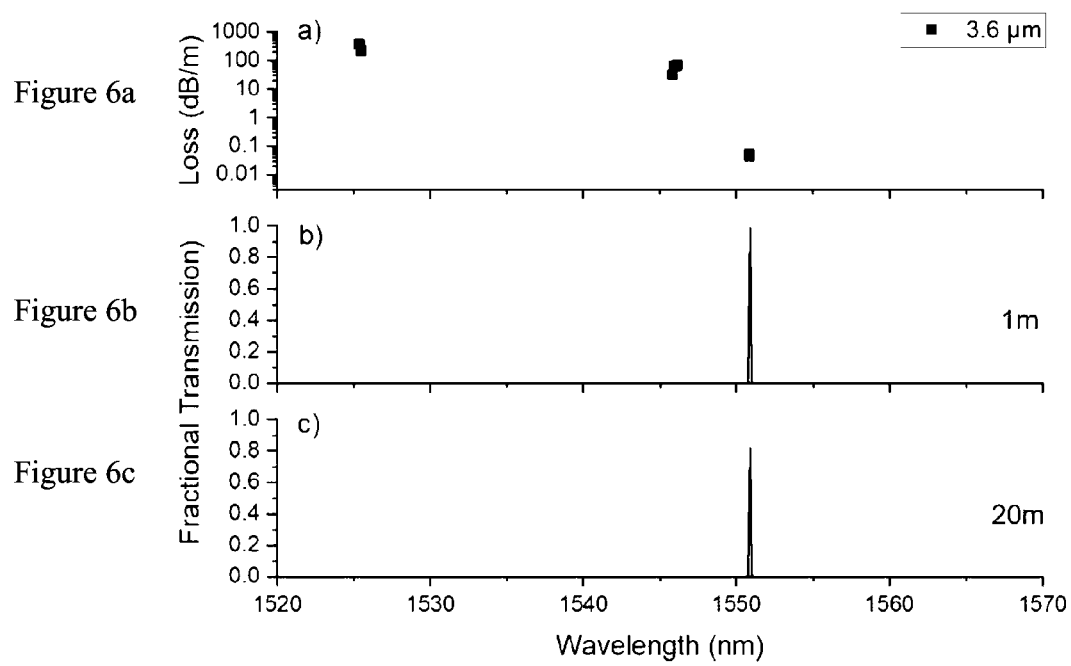
Figure 6a
Figure 6b
Figure 6c

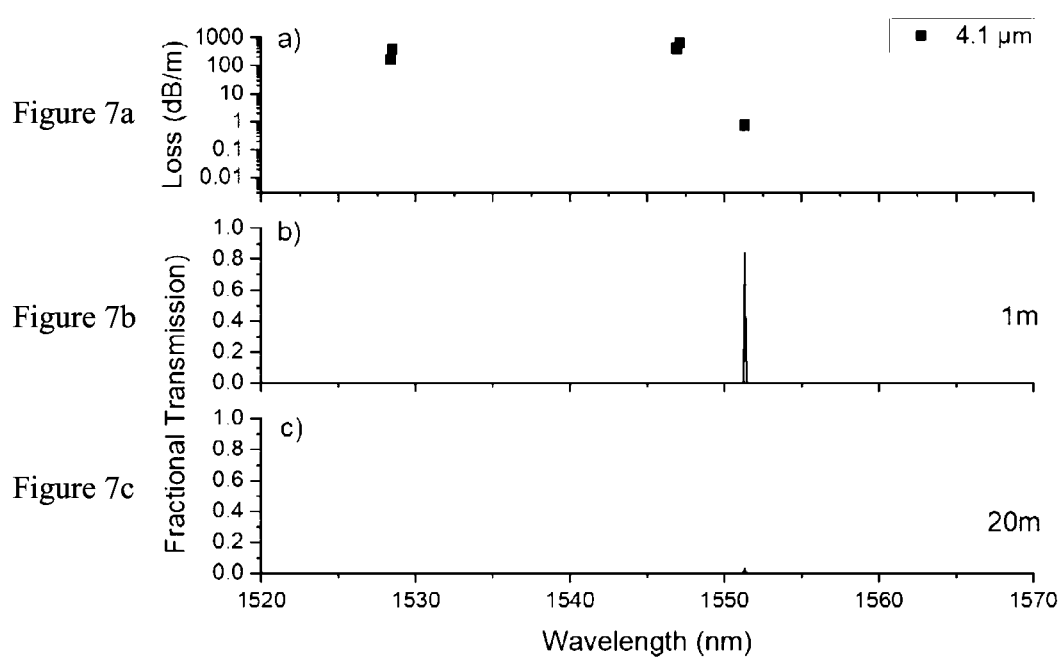
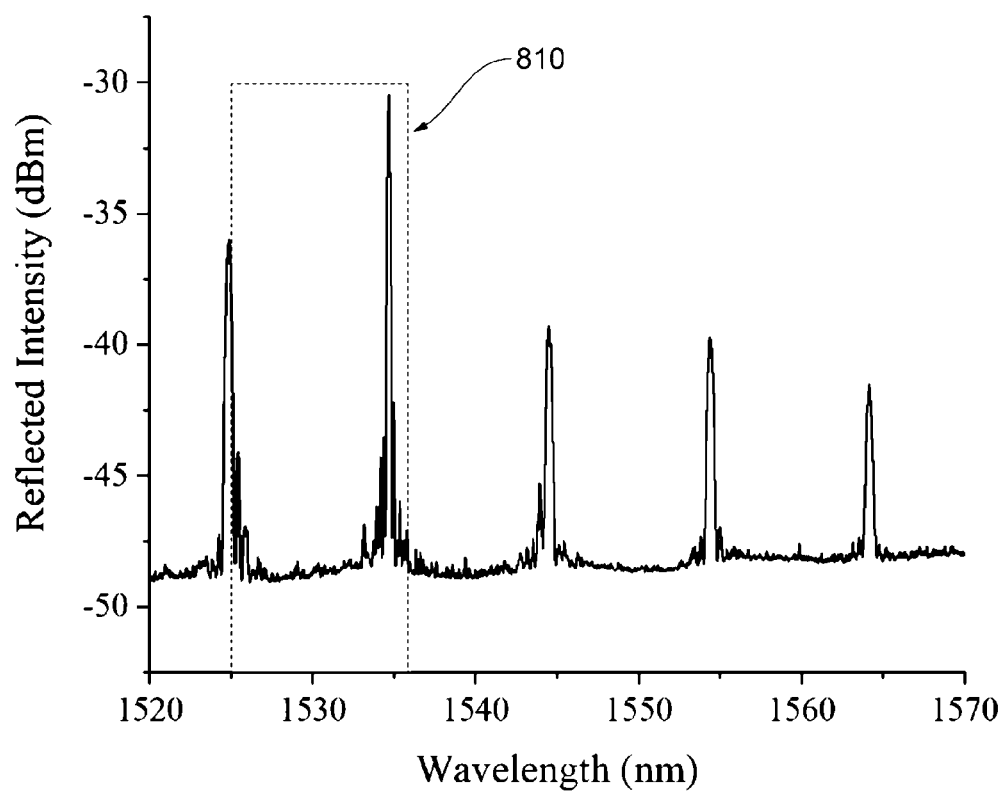
Figure 8a

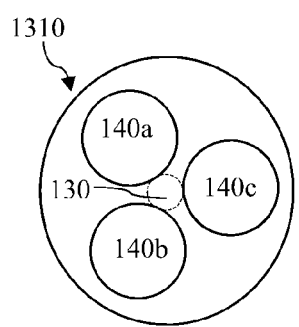
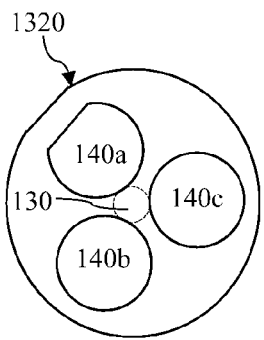
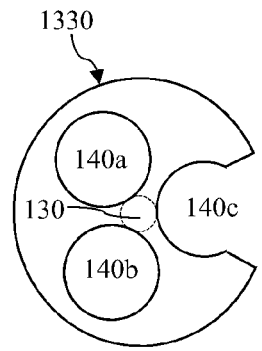
Figure 13a          Figure 13b          Figure 13c
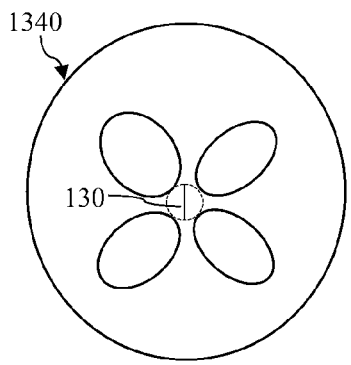
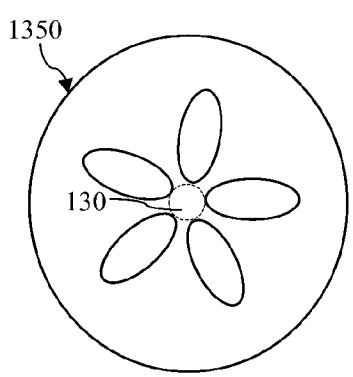
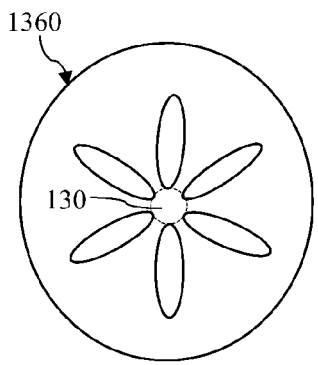
Figure 13d          Figure 13e          Figure 13f
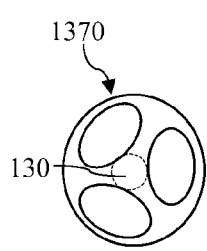
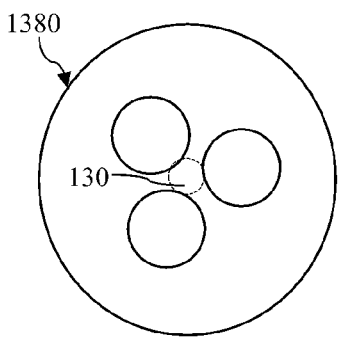
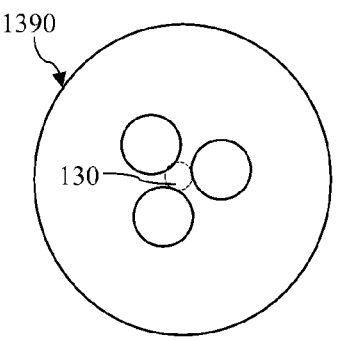
Figure 13g          Figure 13h          Figure 13i

MICROSTRUCTURED OPTICAL FIBER SENSOR

CROSS-REFERENCE TO RELATED APPLICATIONS

This application is the United States national phase of International Application No. PCT/AU2020/000118 filed Oct. 8, 2020, and claims priority to Australian Provisional Patent Application No. 2019903789 filed on Oct. 8, 2019, the disclosures of which are hereby incorporated by reference in their entirety.

INCORPORATION BY REFERENCE

The following co-pending patent application is referred to in the description:

PCT Application No PCT/AU2015/000011 (WO 2016/112422 A1) titled "TEMPERATURE SENSOR", filed 14 Jan. 2015 in the name of ADELAIDE RESEARCH & INNOVATION PIN LTD (Multi-mode Sensor Application), an entity related to the current Applicant, and whose contents are incorporated by reference in their entirety.

BACKGROUND OF THE INVENTION

Field of the Invention

The present disclosure relates to fiber sensors. In a particular form, the present disclosure relates to a microstructured optical fiber-based sensor for measurements at multiple sensing locations.

Description of Related Art

In the Multimode Sensor Application the Applicant disclosed a temperature sensor in the form of a microstructured optical fiber (MOF) and in particular the use of a suspended core (SC) MOF geometry consisting of three or more evenly spaced longitudinal channels extending along the fiber creating a glass core in which the light confinement comes from the glass:air index contrast (eg, see FIG. 2). A fiber Bragg grating (FBG) is formed in the microstructured optical fiber by generating a periodic modulation in the refractive index along a core region of the glass core of the microstructured optical fiber. This FBG then produces band reflection at a reflection wavelength that varies in accordance with changes in temperature at the core region of the optical fiber.

These sensors have been very successful in high temperature sensing applications but not without some limitations in circumstances where more than three temperature sensing locations are to be deployed on a single fiber. This is because the configuration or geometry of the SC-MOF comprising the temperature sensor supports the transmission of multiple guided modes within the fiber. As a consequence, FBGs written within the fiber therefore showed a reflected FBG band spectra having a number of resonant peaks corresponding to the fundamental mode and these additional higher order modes (HOMs) which typically span an extended bandwidth which may range from 4-16 nm.

This bandwidth requirement puts a fundamental limit on the possible wavelength separation of gratings written at different sensor locations within the same fiber before the reflected wavelength location of the HOMs begin to overlap with the reflected wavelengths of the fundamental or HOMs from adjacent gratings for multiplexed applications. In addition, the inclusion of HOMs also adds to the complexity of analyzing the peak positions as a peak tracking algorithm is required to determine which of the peaks should be tracked. This can lead to potential issues if the peak tracking algorithm inadvertently switches between modes for a given sensing location within the fiber. As would be appreciated, having multiple sensing locations deployed on a single fiber, such as 5, 10, 20, 40 or even 60 sensing locations, would greatly increase the application of the sensor in performing spatially resolved temperature measurements and correspondingly would reduce the requirements for multiple cables and multiple optical fiber sensor interrogator channels.

One possibility for reducing the modal content of a SC-MOF is to physically reduce the size of the fiber core, however, the size reduction required impacts the ability to form an FBG on the core by femtosecond laser ablation, which is required for sensing in high temperature regimes. This then results in a reduction of the quality of the FBG causing unacceptably high losses. In addition, when the core size is significantly different to that of the lead-in single-mode optical fiber (SMF) used to connect a SC-MOF to standard telecommunications equipment the mismatch between core sizes can result in high splice losses.

Another option to facilitate single mode guidance that is referred to in the Multimode Sensor Application (eg, see FIG. 11 of the Multimode Sensor Application) is to form a plurality of regularly spaced longitudinal channels located opposed to the main channel incorporating the FBG where these regularly spaced longitudinal channels are arranged in respective part-circular rings with respect to the core of the SC-MOF. However, as would be appreciated, this non-regular geometry initially involves an additional layer of complexity when forming the SC-MOF and furthermore gratings can only be written from a single side of the fiber, increasing the fabrication requirements in orientating the fiber for the FBG writing process.

It is against this background that it would be desirable to provide a microstructure optical fiber sensor that is capable of supporting multiple sensing locations on a single fiber.

SUMMARY OF THE INVENTION

In a first aspect, the present disclosure provides a microstructured optical fiber sensor operable up to a predetermined temperature for sensing changes in a physical characteristic, comprising:
  a microstructured optical fiber comprising:
    an inner suspended core;
    an outer jacket region;
    at least three longitudinal channels extending along the microstructured optical fiber;
    intra-channel struts separating the at least three longitudinal channels and extending radially from the inner suspended core to the outer jacket region;
  a fiber Bragg grating formed in the microstructured optical fiber by generating a periodic modulation in the refractive index along a core region of the suspended core, the fiber Bragg grating configured to produce a band reflection spectra comprising a fundamental mode and a plurality of higher order modes whose respective wavelengths vary in accordance with changes in the physical characteristic at the core region of the microstructured optical fiber, wherein the microstructured optical fiber is configured in operation to increase a confinement loss of the plurality of higher order modes of the band reflection spectra relative to the fundamental mode.

In another form, the microstructured optical fiber sensor includes an interrogation end for measurement of the band reflection spectra and an operating length corresponding to the distance between a sensing location comprising the fiber Bragg grating and the interrogation end and wherein the microstructured optical fiber sensor is configured to have a predetermined confinement loss of the plurality of higher order modes relative to the fundamental mode based on the operating length.

In another form, the predetermined confinement loss of the plurality of higher order modes of the band reflection spectra relative to the fundamental mode is selected to suppress the plurality of higher order modes to allow measurement only of the fundamental mode at the interrogation end.

In another form, the intra-channel struts have a corresponding strut width and the inner suspended core has a core diameter and wherein the microstructured optical fiber is configured to have the strut width between 0.25-0.5 times the core diameter.

In another form, the microstructured optical fiber is configured to have the strut width between 0.27-0.48 times the core diameter.

In another form, the microstructured optical fiber is configured to have the strut width between 0.29-0.45 times the core diameter.

In another form, the intra-channel struts have a corresponding strut length and wherein the microstructured optical fiber is configured to have the strut length at least greater than or equal to the core diameter.

In another form, the microstructured optical fiber is configured to have the strut length at least twice the core diameter.

In another form, the microstructured optical fiber is configured to have the strut length at least three times the core diameter.

In another form, the microstructured optical fiber sensor includes an interrogation end for measurement of the band reflection spectra and an operating length corresponding to the distance between the fiber Bragg grating and the interrogation end and wherein the microstructured optical fiber sensor is configured to have a confinement loss of the fundamental mode over the operating length of less than a predetermined loss parameter and a suppression ratio comparing the loss of a first higher order mode to the fundamental mode over the operating length greater than a predetermined suppression ratio.

In another form, the predetermined loss parameter of the fundamental mode is less than 60 dB.

In another form, the predetermined suppression ratio is greater than 3.

In another form, a size of the suspended core is configured to be matched with a single mode fiber (SMF) carrier.

In another form, the physical characteristic is temperature.

In another form, the physical characteristic is strain.

In another form, the physical characteristic is pressure.

In another form, the periodic modulation in the refractive index along the core region is formed by laser ablating defects along the core region of the microstructured optical fiber.

In another form, the microstructured optical fiber is formed of silica material and the sensor is configured for a predetermined temperature of at least 700° C.

In another form, the microstructured optical fiber is formed of silica material and the sensor is configured for a predetermined temperature of at least 1000° C.

In another form, the microstructured optical fiber is formed of silica material and the sensor is configured for a predetermined temperature of at least 1350° C.

In another form, the microstructured optical fiber is formed of silica material and the sensor is configured for a predetermined temperature of at least 1550° C.

In another form, the microstructured optical fiber is formed of sapphire crystal and the sensor is configured for a predetermined temperature of at least 1600° C.

In another form, the microstructured optical fiber is formed of sapphire crystal and the sensor is configured for a predetermined temperature of at least 2000° C.

In a second aspect, the sensor includes a second fiber Bragg grating formed in the microstructured optical fiber by generating a periodic modulation in the refractive index along a second core region of the microstructured optical fiber, the second core region spaced from the core region of the fiber Bragg grating, wherein the second fiber Bragg grating is configured to produce a second band reflection spectra at different wavelengths to the band reflection spectra of the fiber Bragg grating, the second band reflection spectra comprising a second fundamental mode and a plurality of associated higher order modes, wherein the respective wavelengths of the second band reflection spectra vary in accordance with changes in the physical characteristic at the second core region of the microstructured optical fiber, wherein the microstructured optical fiber is configured in operation to increase a confinement loss of the plurality of associated higher order modes of the second band reflection spectra relative to the second fundamental mode.

In a third aspect, the present disclosure provides a sensing system including:
- a source of electromagnetic radiation;
- a microstructured optical fiber sensor in accordance with the first aspect, the microstructured optical fiber sensor interfaced to the source of electromagnetic radiation;
- a detector for detecting the band reflection spectra from the core region of the microstructured optical fiber sensor where the fiber Bragg grating is located, the detector interfaced to the microstructured optical fiber sensor; and
- a data processor for determining a physical characteristic at the core region based on the shift of the fundamental mode of the band reflection spectra.

In a fourth aspect, the present disclosure provides a multiplexed sensing system including:
- a source of electromagnetic radiation;
- a microstructured optical fiber sensor in accordance with the second aspect, the microstructured optical fiber sensor interfaced to the source of electromagnetic radiation;
- a detector for detecting the band reflection spectra from the core region where the fiber Bragg grating is located and the second band reflection spectra from the second core region where the second fiber Bragg grating is located, the detector interfaced to the microstructured optical fiber sensor; and
- a data processor for a physical characteristic at both the core region and the second core region of the microstructured optical fiber sensor based on the respective shifts of the fundamental mode of the band reflection spectra and the second fundamental mode of the second band reflection spectra.

BRIEF DESCRIPTION OF DRAWINGS

Embodiments of the present disclosure will be discussed with reference to the accompanying drawings wherein:

FIGS. 3a and 3b are plots comparing the band reflection spectra of a prior art sensor (ie, FIG. 3a) as compared to the sensor illustrated in FIG. 2 (ie, FIG. 3b);

FIGS. 4a, 4b and 4c are plots of numerical simulations depicting the band reflection characteristics of a microstructured optical fiber sensor having a strut width of 2.7 µm, including the intensity loss as a function of wavelength in dB/m for the fundamental mode and HOMs (FIG. 4a); and the fractional transmission of the band reflection spectra for the fundamental mode and HOMs for a fiber length of 1 m (FIG. 4b) and 20 m (FIG. 4c);

FIGS. 5a, 5b and 5c are plots of numerical simulations depicting the band reflection characteristics of a microstructured optical fiber sensor having a strut width of 2.9 µm, including the intensity loss as a function of wavelength in dB/m for the fundamental mode and HOMs (FIG. 5a); and the fractional transmission of the band reflection spectra for the fundamental mode and HOMs for a fiber length of 1 m (FIG. 5b) and 20 m (FIG. 5c);

FIGS. 6a, 6b and 6c are plots of numerical simulations depicting the band reflection characteristics of a microstructured optical fiber sensor having a strut width of 3.6 µm, including the intensity loss as a function of wavelength in dB/m for the fundamental mode and HOMs (FIG. 6a); and the fractional transmission of the band reflection spectra for the fundamental mode and HOMs for a fiber length of 1 m (FIG. 6b) and 20 m (FIG. 6c);

FIGS. 7a, 7b and 7c are plots of numerical simulations depicting the band reflection characteristics of a microstructured optical fiber sensor having a strut width of 4.1 µm, including the intensity loss as a function of wavelength in dB/m for the fundamental mode and HOMs (FIG. 7a), the fractional transmission of the band reflection spectra for the fundamental mode and HOMs for a fiber length of 1 m (FIG. 7b) and 20 m (FIG. 7c);

FIG. 8a is a plot of the reflected intensity as a function of wavelength of a sensor incorporating five sensor regions in accordance with an illustrative embodiment, showing a comparison to the required bandwidth needed for sensors based on prior art;

FIG. 9b is a plot of numerical simulations of the ratio of the loss between the fundamental mode of the band reflection spectra and the first higher order mode as a function of strut width for the equivalent range of core diameters illustrated in FIG. 9a;

FIGS. 13a to 13i are end sectional representations of various microstructured optical fiber sensors configured in accordance with embodiments of the present disclosure;

In the following description, like reference characters designate like or corresponding parts throughout the figures.

DESCRIPTION OF THE INVENTION

Figure 1:
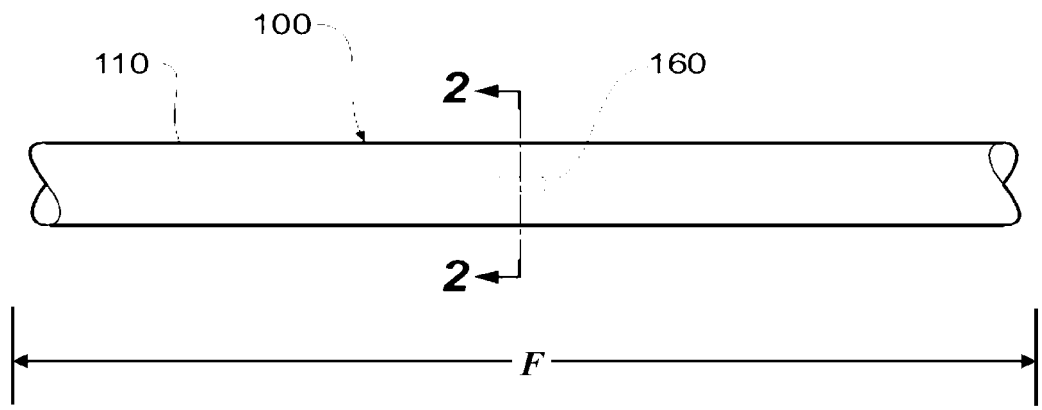
FIG. 1 is a figurative top view of a sensor in accordance with an illustrative embodiment.
Figure 2:
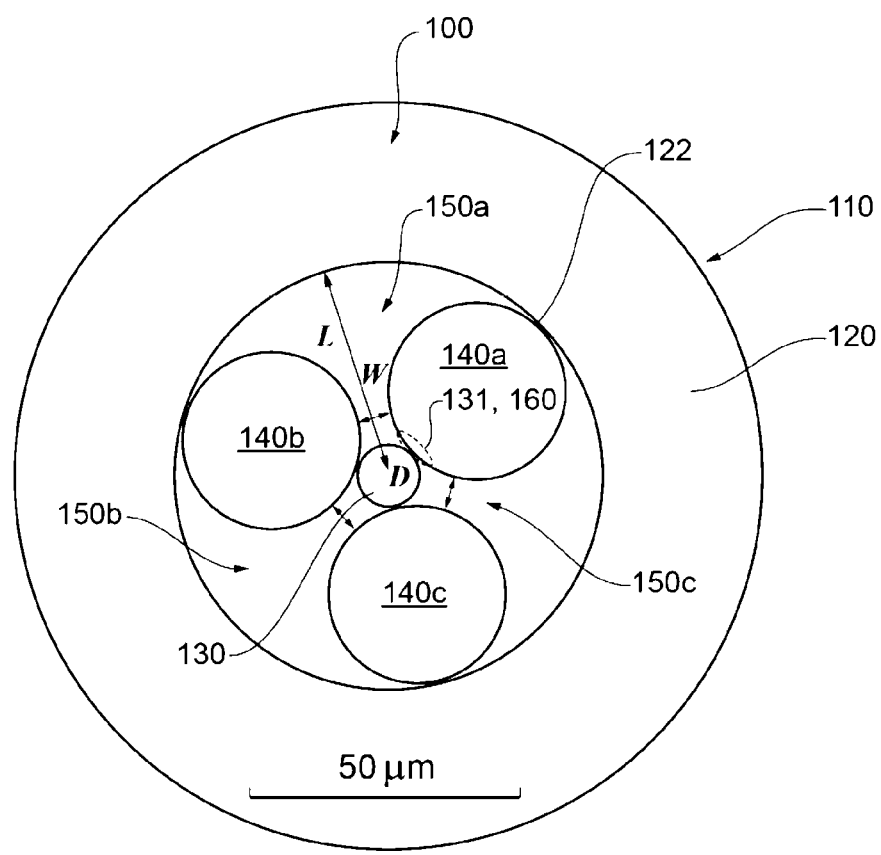
FIG. 2 is an end-sectional image of the sensor illustrated in FIG. 1.

Referring now to FIGS. 1 and 2, there are shown top figurative and side sectional views of a microstructured optical fiber sensor 100 according to an illustrative embodiment. In this embodiment, fiber sensor 100 is formed of a microstructured optical fiber 110 formed of silica material. In this example, the silica material is a commercially available electrically fused quartz glass, HSQ300™, available from Heraeus Quarzglas GmbH & Co KG. As would be appreciated, silica is drawn at temperatures of approximately 2000° C. and as such provides a fiber material having excellent temperature characteristics for measuring at elevated temperatures from at least 500° C. and potentially up to a maximum temperature of approximately 1600° C. As shown in FIG. 1, fiber 110 will have a length F.

Microstructured optical fiber 110 includes an outer cladding or jacket region 120 and an inner centrally disposed suspended core 130 that extends longitudinally along fiber sensor 100 and having a diameter D and further includes, in this example, three longitudinal channels 140a, 140b, 140c extending along the microstructured optical fiber 110 between the inner suspended core 130 and the outer jacket region 120 and forming corresponding intra-channel struts 150a, 150b, 150a having a strut width W and separating the three enclosed longitudinal channels 140a-140b, 140b-140c, 140c-140a. Intra-channel struts 150a, 150b, 150a extend radially from the inner suspended core 130 to the outer jacket region 120 and longitudinally along the microstructured optical fiber 110 and function to support or suspend the inner suspended core 130.

As would be appreciated, in other embodiments the inner suspended core may be supported by more than three radially extending struts which need not necessarily be distributed in an equiangular manner about the inner suspended core and these would in turn form an associated number of inter-strut channels that surround the core (eg, see FIGS. 13d, 13e and 13f). Furthermore, while the longitudinal channels 140a, 140b, 140c in microstructured optical fiber 110 are enclosed by the outer jacket region 120 it would be understood that one or more of the channels could be open to the environment by removing the outer jacket region in a portion along the microstructured optical fiber corresponding to the open channel (eg, see FIG. 13c).

Incorporated into the microstructured optical fiber is a FBG 160 which in this example is formed along a core region of the core 130. In broad terms, a FBG are formed by creating a periodic modulation in the refractive index of an optical fiber. The FBG causes a band reflection spectra at the location of the grating at the Bragg or reflection wavelength, $\lambda_B$, where $\lambda_B$ is linearly dependent both on the pitch, $\Lambda$, of the periodic modulation and the effective refractive index, $n_{eff}$, of each mode supported by the optical fiber. Accordingly, for a multimode fiber there will be a Bragg reflection wavelength for the fundamental mode, $\lambda_{B_F}$, and each higher order mode where each higher order mode will have a progressively lower effective refractive index as compared to the fundamental mode.

This narrowband reflection then causes a dip in the transmission spectrum and a peak in reflection at $\lambda_{B_F}$ corresponding to the fundamental mode and then further dips in the transmission spectrum and corresponding peaks related to HOMs that are offset from $\lambda_{B_F}$. For the temperature sensor embodiment described in the Multimode Sensor Application, whose entire contents are incorporated by reference in their entirety, as the temperature of the grating substrate increases the effective index also increases. This then causes a shift in the position of the reflection wavelength $\lambda_{B_F}$ and the associated HOMs to a higher wavelength. Similarly, if the temperature decreases the effective index of the substrate reduces and the position of $\lambda_{B_F}$ and the HOMs will shift to a lower wavelength. As this wavelength shift can be directly related to the change in effective index, which in turn may be directly associated with the change in temperature, monitoring of the value of $\lambda_{B_F}$ and/or the wavelengths of the higher modes will allow temperature to be determined.

Similarly, other physical characteristics may be sensed where the band reflection spectra changes in accordance with changes in the physical characteristic. Examples include, but are not limited to the strain and pressure applied to the fiber sensor proximate to the core region where the FBG is located.

In this embodiment, the FBG 160 is written into or ablated into an outer surface portion or core region 131 of the core 130 by the use of a femtosecond laser which generates a periodic modulation in the refractive index by physical removal of material to produce defects in the form of a series of cavities or holes (also known as "nano-holes") along the core 130. This process is described in detail in the Multimode Sensor Application. As discussed previously, the configuration or geometry of the SCF disclosed in the Multimode Sensor Application has proved to be very successful for sensing in high temperature regimes, however, this geometry supports multiple guided modes which compromise the ability to deploy multiple sensing locations along the fiber. In one example, the core region 131 may be located in an open channel of the microstructured optical fiber to facilitate the ablation or physical removal of material in order to produce the nano-holes along the core. In one example, the length of the FBG is less than 20 mm. In another embodiment, the length of the grating is between 1-5 mm.

In this illustrative embodiment, and in contrast to known configurations of microstructured optical fibers, the configuration of the microstructure optical fiber 110 has been adapted to increase the confinement loss of the HOMs of the band reflection spectra relative to the fundamental mode. In this example, this has been achieved by thickening the radially extending struts 150 to have a strut width, W, greater than 3 µm, for a core diameter, D, of approximately 10 µm. In this example, the strut width W equals 4.25 µm and the core diameter D equals 10.5 µm and strut length is 37 µm based on the definition below.

Throughout this specification, the strut width, W, is defined to be minimum width of a radially extending intra-channel strut 150 when viewed in cross section. Furthermore, throughout this specification the core diameter, D, is defined to be the diameter of the largest circle that fits wholly within the inner suspended core 130 when viewed in cross section. Through this specification the strut length, L, is defined as the distance between the central point of the core, and the edge of a circle 122 that circumscribes the outer periphery of the channels 140a, 140b, 140c within the microstructured optical fiber 110.

In this example, the strut width W of the sensor 100 while maintaining the core diameter may be varied during the drawing of the preform by controlling the pressure applied to the center structured region and the outer diameter of the fiber to create the desired structure. Lower pressures give less inflation of the structure, resulting in thicker, shorter struts with a similar core diameter. As such, adjustments to the fiber geometry may be made during the fiber drawing process itself, with a single preform geometry (eg, three longitudinal channels) able to be used for a wide variety of strut thicknesses by altering the pressure applied to the central structure and the outer diameter of the fiber.

In this manner, fibers of different core diameters D, strut widths W and strut lengths L may be fabricated either through changing the pressure during the drawing process or creating an initial structure from the bulk glass with a different ratio between the outer diameter, hole diameter and core sizes.

Referring now to FIGS. 3a and 3b, there are shown plots comparing the band reflection spectra of a prior art sensor (ie, plot shown in FIG. 3a) as compared to the sensor 100 illustrated in FIG. 2 (ie, plot shown in FIG. 3b) as measured at an interrogation or measurement end of the microstructured optical fiber. In this example, the prior art sensor has a core diameter D equal to 9.8 µm and a strut width of 2.65 µm. As can be determined by inspection, the band reflection spectra 310 of the prior art sensor consists of a fundamental mode 320 and associated HOMs 320a, 320b, 320c, 320d as compared to the band reflection spectra 350 of a sensor in accordance with the present disclosure having a fundamental reflection mode 360 and no associated HOMs. Both of these examples are based on an operating length between sensing location comprising the FBG and the interrogation end for the microstructured optical fiber of 1 meter.

Throughout this specification the term "operating length" when used with respect to a microstructured optical fiber sensor is the maximum length from a sensing location comprising a FBG to an interrogation end of the optical fiber where the band reflection spectra will be measured by an optical sensor interrogator or equivalent apparatus. For a microstructured optical fiber sensor comprising multiple sensing locations, each sensing location will have a corresponding operating length and the "maximum operating length" is defined to be the distance from the most remote sensing location to the interrogation end of the fiber sensor.

As can be seen by inspection of FIGS. 3a and 3b, the bandwidth, BW, defined in this specification to be the spectral width required to contain all peaks at least 5 dB over the background, for band reflection spectra 350 of temperature sensor 100 is substantially narrower (ie, BW of 1.2 nm) than that of the prior art sensor (ie, BW of 11.6 nm). As can also be seen, the spectral width of the individual peaks of the two fibers is comparable (within approximately 0.2 nm) with the primary difference between the band reflection spectra 310 and 350 spectra being the suppression of the HOMs in band reflection spectra 350 relative to the fundamental mode. As such, microstructured optical fiber sensors configured in accordance with the present disclosure will only require an operating bandwidth that can accommodate the BW of 1.2 nm based on in this example an operating length of the order of 1 meter.

This significant reduction in BW for each FBG allows an increased number of individual gratings to be placed in a single microstructured optical fiber so that gratings may be separately sensed and monitored at multiple locations on the length of the fiber. As discussed previously, sensors involving HOMs for each FBG place a fundamental restriction on the density of sensing locations in a single fiber as the wavelength spacing between the adjacent gratings must be greater than the bandwidth BW plus the wavelength shift that corresponds to the expected shift in wavelength from the variation of the physical characteristic being sensed.

In this example, effective suppression of the HOMs of the band reflection spectra is achieved by configuring the structure of the microstructured optical fiber to increase the confinement loss of the HOMs of the band reflection spectra relative to the fundamental mode. In this example, the confinement loss of the HOMs relative to the relative to the fundamental mode is increased to a predetermined confinement loss based on the operating length. This may be contrasted to an approach where the HOMs are completely suppressed by choosing a fiber geometry having a very small core size or very low numerical aperture.

A very low numerical aperture is typically achieved by using two glass materials (eg, GeO doped silica and pure silica, as used for a conventional single-mode fiber) rather than a glass:air structure. Such an optical fiber is less suited to high temperature operation due to potential diffusion of the dopants which will modify the structure of the optical fiber. Alternatively, a purely glass:air microstructured optical fiber requires core diameters smaller than approximately 600 nm in order to be fundamentally single-mode. As would be appreciated, such a small core diameter for a microstructured optical fiber is fragile, complex to fabricate, and does not splice readily to conventional single-mode fibers.

In the approach of adapting the configuration of the microstructured optical fiber to increase the confinement loss of the HOMs relative to the fundamental mode there will also likely be some confinement loss for the fundamental mode. As will be discussed below, the configuration may be adapted to have a predetermined confinement loss so as to preserve the fundamental mode over the desired operating length of the microstructured optical fiber sensor while providing for a significantly higher loss for the HOMs over this operating length to allow measurement only of the fundamental mode.

As an example, losses of 1 dB/m for the fundamental mode of the band reflection spectra would restrict the operating length of the fiber between the interrogation end of the fiber sensor and the FBG grating to 10-15 m before the reflected signal is too weak to be observed over the background reflections from the fiber. In accordance with the present disclosure, the configuration of the microstructure optical fiber may be designed or adapted based on the desired operating length of the fiber sensor. As an example, for an operating length of 20 m the fundamental mode in the adapted configuration would provide a confinement loss of about 0.1 dB/m considering the operating length, while the confinement loss for the HOMs will be greater than approximately 10 dB/m (ie, a suppression ratio of 100) as a result reducing the loss of the fundamental mode to an acceptable level where the signal can still be detected while removing the contribution from the HOMs to allow measurement only of the fundamental mode.

Referring now to FIGS. 4a, 4b and 4c there are shown plots depicting the band reflection characteristics of a microstructured optical fiber sensor having the configuration depicted in FIG. 2 but having a strut width of 2.7 µm and a core size of approximately 10 µm. The band reflection characteristics were determined by importing the geometry of a fabricated fiber into a commercial finite element method (FEM) package, Comsol Multiphysics™, to determine the confinement loss of both the fundamental modes and HOMs guided within the fiber.

In this example, the effective index $n_{eff}$ of the fiber has been converted to an effective Bragg wavelength reflection, following $m\lambda_B = 2\Lambda n_{eff}$ using an assumed pitch for a second order (m=2) grating of pitch 1.077 µm to give a fundamental mode reflection of around 1550 nm. In this modelling, the "minimum practical loss" of the fibers is set to 10 dB/km, as modes with a confinement loss lower than this will be dominated by losses from scattering or material losses in the microstructured optical fiber below this value. In addition, HOMs with losses above 1000 dB/m have been removed. The core diameters of each of the fibers were essentially constant ranging from 8.5-10 µm depending on manufacturing variances.

FIG. 4a depicts the intensity loss as a function of wavelength in dB/m for the fundamental mode and HOMs. To understand how the modal losses translate to the resultant FBG spectra, the losses were converted to a dimensionless fractional transmission parameter by considering the confinement loss from a peak with an intensity of one for each mode found by the FEM model. FIG. 4b depicts the fractional transmission exhibiting the confinement loss for each of the modes assuming measurement at the end of fiber having an operating length of 1 meter while FIG. 4c depicts the fractional transmission for a fiber having an operating length of 20 meters, ie, what is the signal 20 meters from the FBG. FIGS. 5a, 5b and 5c; 6a, 6b and 6c; and 7a, 7b and 7c depict equivalent plots to FIGS. 4a, 4b and 4c except for strut widths of 2.9 µm, 3.6 µm and 4.1 µm respectively. As can be seen from these figures, the confinement loss for the fundamental mode increases with increasing strut width, however, an important additional consideration is the difference between the confinement loss of the fundamental mode and that of the HOMs guided within the fiber.

As can be seen from FIGS. 4a, 4b and 4c, if the difference in the confinement loss between the fundamental mode and the HOMs is small, then any reduction in the strength of HOMs will be accompanied by an essentially equivalent reduction in the strength of the fundamental mode. A fiber with strut thickness of 2.7 µm, and strut length 56 µm, clearly shows a large number of modes with similar loss resulting in the HOMs being present for fibers having an operating length of both 1 m and 20 m such that an FBG in this fiber would display a large number of peaks over a broad bandwidth.

As can be seen in FIGS. 5a, 5b and 5c, a microstructured optical fiber sensor based on a 2.9 µm strut width, and 53 µm strut length, exhibits a HOM suppression ratio or factor of approximately 26 between the first HOM as compared to the fundamental mode resulting in both modes being present for fibers having an operating length of 1 m and 20 m although the next level of HOMs are not present.

As can be seen in FIGS. 6a, 6b and 6c, a microstructured optical fiber sensor based on a 3.6 μm strut width, and 38 μm strut length, exhibits a HOM suppression ratio of approximately 380 between the first HOM as compared to the fundamental mode (ie, approximately 0.05 dB/m loss) resulting in only the fundamental mode being present in fibers having an operating length of 1 m and 20 m, making this configuration ideal for a fiber based sensor having an operating length in this range.

Referring now to FIGS. 7a, 7b and 7c, a microstructured optical fiber sensor based on a 4.1 μm strut width, and 37 μm strut length, exhibits a loss of approximately 1.4 dB/m for the fundamental mode resulting in complete loss of the reflection peak signal for a fiber based sensor having an operating length of 20 m but still with an available reflection peak signal corresponding to the fundamental mode for the 1 m fiber sensor.

Referring now to FIG. 8a, there is shown a plot of the reflected intensity as a function of wavelength of a microstructured optical fiber sensor incorporating five sensing regions according to an illustrative embodiment. In this example, the fiber sensor includes a series of five 2 mm long FBGs written immediately adjacent to each other in the fiber at respective core locations with a 10 nm wavelength spacing between adjacent gratings. The total fiber length here is 1 m with a strut thickness of 3.7 μm corresponding substantially with the fiber shown in FIGS. 6a, 6b and 6c.

In this example, gratings of different pitches were located next to each other along the length of the fiber, with all five gratings written in a single pass by changing the movement speed of the stage while writing at a fixed repetition rate of the writing laser, however in another implementation the gratings could be written individually either next to each other as presented here, or at arbitrary locations corresponding to different core regions along the length of the fiber.

In this example each peak of the respective band reflection spectra shows clean spectral features, with effectively one single peak corresponding to the fundamental mode of the respective FBG per grating wavelength. In this manner, the fundamental modes and associated suppressed HOMs of each FBG are distinct with respect to each other. In this example, the gratings are spaced at 10 nm intervals 810. For a temperature sensor this corresponds to a temperature variation of 750° C. from ambient. If the expected temperature difference of the temperature sensor is lower, then the wavelength spacing between the gratings could be reduced further to maximize the number of possible sensors for the available bandwidth.

As would be appreciated, to obtain a similar capacity for temperature change, the thin-strut fiber would need FBGs to be written at a spacing of at least 20 nm, giving a maximum of three gratings on a single fiber assuming in this case an interrogator with an 80 nm bandwidth.

In other cases where the potential temperature difference between adjacent sensors is lower, the wavelength spacing between adjacent sensors may be further reduced without risk of cross-talk as a result further increasing the number of gratings or sensing locations that may be written in a single microstructured optical fiber sensor. In one embodiment, where there is expected a 400° C. *maximum* temperature difference between the adjacent sensor locations, the grating spacing could be reduced to 6 nm, allowing for 12 FBGs to be written in a single microstructured optical fiber sensor using an interrogator with an 80 nm bandwidth or 25 for a 160 nm bandwidth representing a significant advance over prior art multiplexed systems.

Figure 8B:
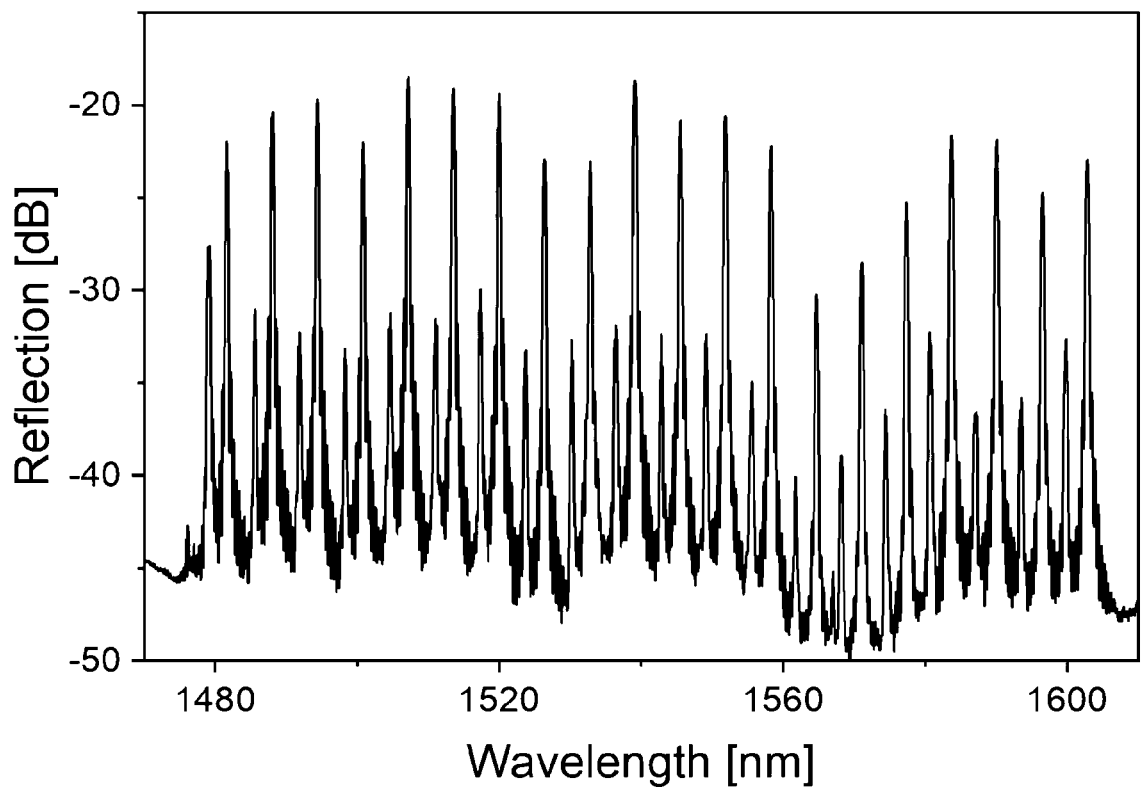
FIG. 8b is a plot of the reflected intensity as a function of wavelength of a sensor incorporating twenty sensor regions in accordance with an illustrative embodiment, with sensors spaced at regular intervals designed to use the full bandwidth of an example interrogator.

Referring now to FIG. 8b, there is shown a plot of the reflected intensity as a function of wavelength of a sensor incorporating twenty sensing regions according to an illustrative embodiment. In this example, the fiber sensor includes a series of twenty 2 mm long FBGs written at 150 mm spacing in the fiber with a 6.5 nm wavelength spacing between adjacent gratings. The total fiber operating length here is 3 m with a strut thickness of 3.2 μm corresponding substantially with the fiber shown in FIGS. 5a, 5b and 5c.

Figure 9A:
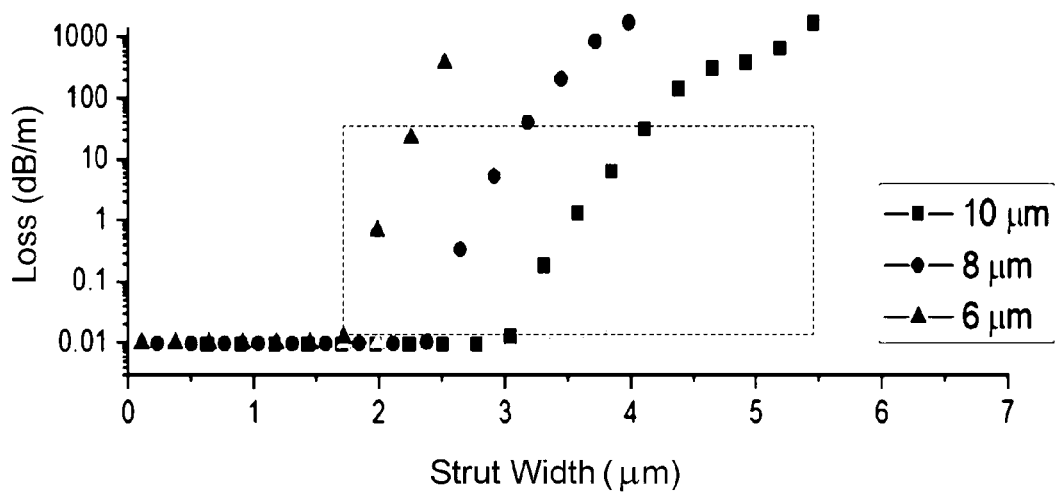
FIG. 9a is a plot of numerical simulations of the intensity loss in dB/m for the fundamental mode (open symbols) of the band reflection spectra as compared to the first higher order mode (equivalent closed symbol) as a function of strut width for a range of core diameters.

Referring now to FIG. 9a, there is shown a plot of the intensity loss in dB/m for the fundamental mode of the band reflection spectra as compared to the first higher order mode as the strut width is varied from 0-6 μm for a range of three different core sizes, 10 μm (square), 8 μm (circle) and 6 μm (triangle). In this plot, the loss for the fundamental mode is depicted as an open symbol and the loss of the first higher order mode is depicted as a closed symbol.

Figure 9B:
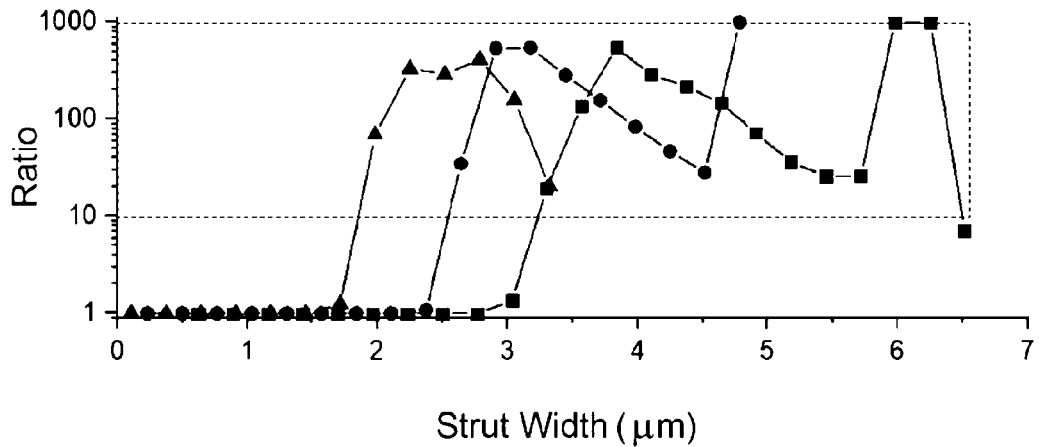

Referring now to FIG. 9b, there is shown a plot of the ratio of the loss between the fundamental mode of the band reflection spectra and the first higher order mode as a function of strut width for the equivalent range of core diameters illustrated in FIG. 9a using equivalent symbols to depict the core diameters. For FIGS. 9a and 9b, the maximum loss value is set to be 30 dB/m. Once the loss value exceeds 30 dB/m for the fundamental mode the operating length of the fiber is restricted to be less than approximately 0.5 m. In this example, this corresponds to a maximum confinement loss of the fundamental mode over the operating length that is less than 60 dB.

Figure 10:
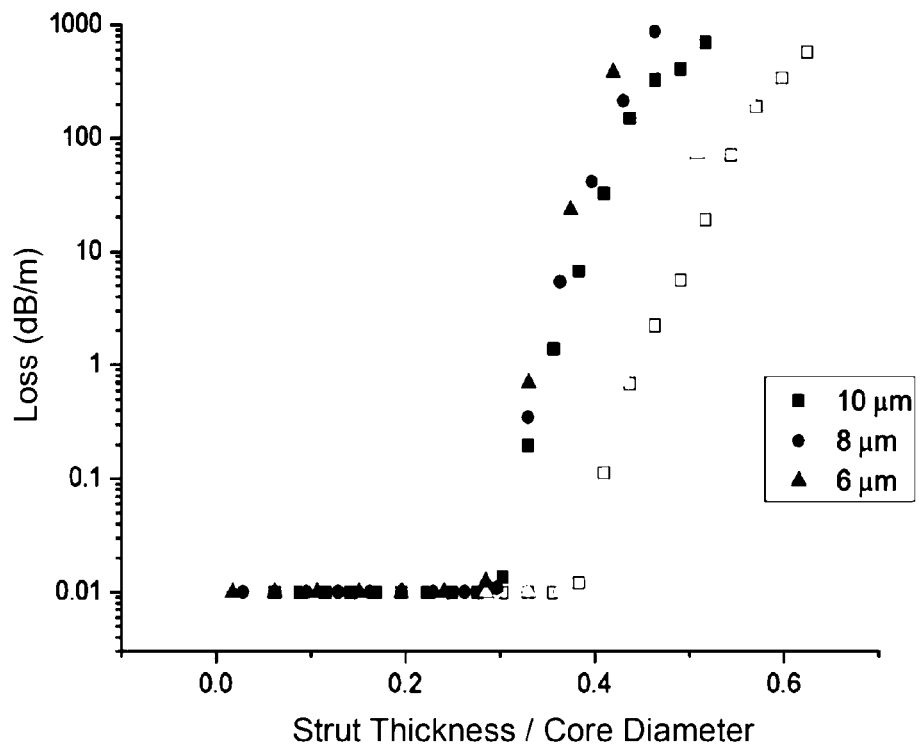
FIG. 10 is a plot of numerical simulations of the intensity loss in dB/m for the fundamental mode of the band reflection spectra as compared to the first higher order mode as a function of the ratio of strut thickness divided by core diameter for the equivalent range of core diameters illustrated in FIGS. 9a and 9b.

Referring now to FIG. 10, there is shown a plot of the intensity loss in dB/m for the fundamental mode of the band reflection spectra as compared to the first higher order mode as a function of ratio of the strut thickness divided by the core diameter for the equivalent range of core diameters illustrated in FIGS. 9a and 9b using equivalent symbols to depict the core diameters. From this plot, it can be seen that above a ratio of approximately 0.4 the loss of the fundamental mode exceeds 1 dB/m in this example. As such, for a core size of 6 μm (triangle) this indicates that the maximum strut width should be approximately 2.4 μm. Similarly for a core size of 8 μm (circle) this indicates that the maximum strut width should be approximately 3.2 μm and for a core size of 10 μm (circle) this indicates that the maximum strut width should be approximately 4.0 μm. From this example it can be inferred that the maximum strut width should be approximately 0.4 times the core diameter.

From FIG. 9b, the minimum suppression ratio is set to be 10, where the suppression ratio is the ratio of the loss of the fundamental mode as compared to the first HOM. As can be seen, a suppression ratio of 10 is achieved with a strut width of 1.85 μm for a core size of 6 μm (triangle) Similarly, a suppression ratio of 10 is achieved with a strut width of 2.55 μm for a core size of 8 μm (circle) and with a strut width of 3.2 μm for a core size of 10 μm (square). From this it can be inferred that the minimum strut width should be approximately 0.30 of the core diameter. Combined with the results of FIGS. 9a, 9b and FIG. 10, in one example a microstructured optical fiber having a strut width to core size ratio of 0.30 to 0.41 will have a minimum suppression ratio of at least 10 and a maximum fundamental mode loss value of 1 dB/m.

As can also be determined by FIGS. 9b and 10, the maximum suppression ratio is achieved with a strut width range of 2.2-2.7 μm for a core size of 6 μm (triangle) (Ratio 0.37-0.51). Similarly, a maximum suppression ratio is achieved with a strut width range of 2.9-3.7 μm for a core size of 8 µm (circle) (Ratio— 0.36-0.47) and with a strut width range of 3.8-4.6 µm for a core size of 10 µm (square) (Ratio— 0.38-0.46).

Figure 11:
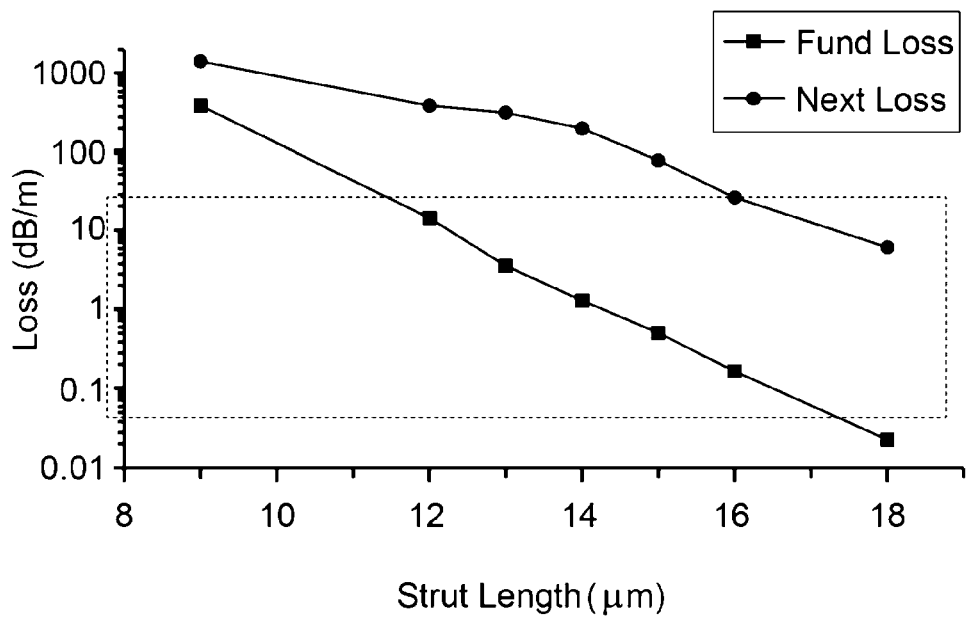
FIG. 11 is a plot of numerical simulations of the loss in dB/m of the fundamental mode and first higher order mode of the band reflection spectra as a function of strut length for a microstructured optical fiber sensor of the configuration illustrated in FIG. 2 and having a fixed core size and strut width.
Figure 12:
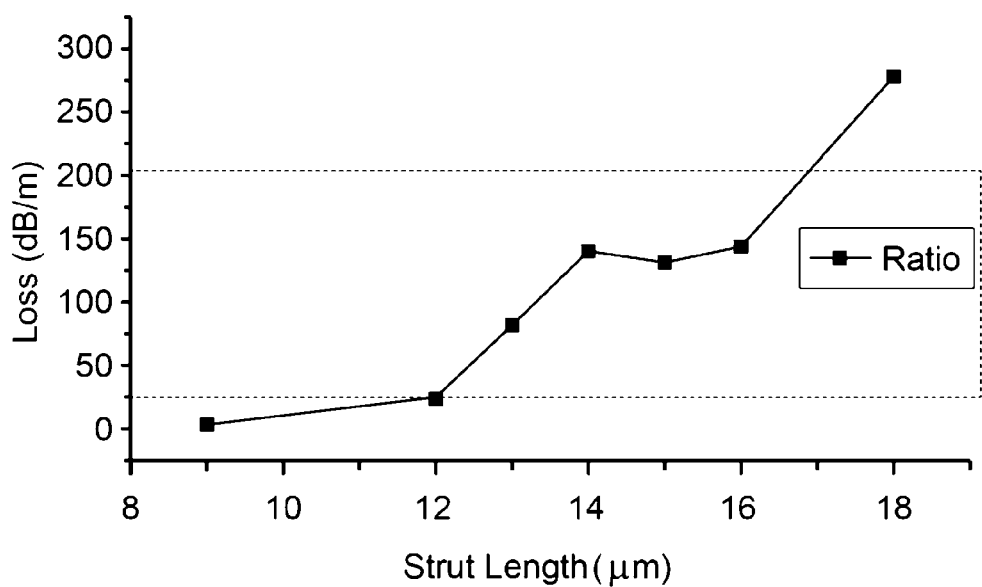
FIG. 12 is a plot of numerical simulations of the suppression ratio comparing the loss of the first higher order mode to the fundamental mode as a function of strut length based on the results of FIG. 11.

Referring now to FIG. 11, there is shown a plot of the loss dB/m of the fundamental mode (squares) and the first HOM of the band reflection spectra as a function of the strut length for microstructured optical fiber having the general configuration illustrated in FIG. 2 but specifically with a core diameter of 10 µm core and strut width of 4.3 µm. In FIG. 12, there is shown a plot of the suppression ratio comparing the loss of the first HOM as compared to the first fundamental mode as a function of strut length for the microstructured optical fiber configuration referred to with reference to FIG. 11.

As can be seen in FIG. 11, once again for a maximum loss of 30 dB/m, a strut length of at least approximately 11 µm corresponding to a ratio of strut length to core diameter of at least 1. This is also reflected in FIG. 12 where a minimum suppression ratio of 10 also indicates a ratio of strut length to core diameter of at least 1.

Referring back to FIG. 12, it can be seen that increasing the strut length relative to the core diameter is indicated for fibers of greater operating length as although the loss for the first HOM is low, the suppression ratio increases meaning that for fibers of increasing length the first HOM will be suppressed relative to the fundamental mode.

The above embodiments relate to fiber sensors having core diameters of approximately 10 µm, which corresponds to the core diameter of standard single mode fiber (eg, SMF28). This allows the microstructured optical fiber to be spliced to the SMF without significant loss, which in turn can be terminated with industry standard connectors (eg. FC/APC) to connect to optical sensor interrogators that are employed to determine the shift in the band reflection spectra. However, it would be appreciated that the core size could be as small as 500 nm or in excess of 50 µm while still maintaining effectively single mode behavior by increasing the confinement loss of the HOMs relative to the fundamental mode in accordance with the present disclosure. As would be appreciated all holes within the embodiment may be different sizes to each other but typically are nominally the same size.

As would be appreciated, the outer diameter may range from 50 µm to 1000 µm, but typically ranges from 80 µm to 200 µm. The core diameter may also vary from 0.5 µm to 70 µm, but typically ranges from 5 µm to 15 µm. In addition, the diameter of the holes may vary from 5 µm to 100 µm, but typically ranges from 10 µm to 60 µm. The number of holes for this type of SC configuration may also vary from three to seven, but is typically three.

Referring now to FIGS. 13a to 13i, there are shown end sectional representations of various microstructured optical fiber sensors configured according to embodiments of the present disclosure. In each of the representations, the largest circle that fits wholly within the inner suspended core 130 is shown in dotted outline to indicate the core diameter.

Shown in FIG. 13a is the cross-sectional configuration or geometry of microstructured optical fiber sensor 1310 which includes in this example three longitudinal channels and where the width of the intra-channel struts is approximately 0.4 of the core diameter (shown in dotted outline) and the strut length is 3.8 times the core diameter.

Shown in FIG. 13b is the cross-sectional configuration or geometry of microstructured optical fiber sensor 1320 which has a substantially identical configuration to 1310 except that cross sectional geometry of longitudinal channel 140a has been configured to further assist the focusing of a laser used to form the FBG. In this example, both the outer surface of fiber sensor 1320 and the outer surface of enclosed channel 140a have been configured to be substantially planar over an extended area to further reduce any potential interference with the focusing of the laser on the core region to form the FBG in this embodiment by laser ablation.

Shown in FIG. 13c is the cross-sectional configuration or geometry of microstructured optical fiber sensor 1330 which has a substantially identical configuration to fiber sensor 1330 except that longitudinal channel 140c, instead of being closed, is open to expose the core region of fiber sensor 1330 to allow the formation of the FBG by a laser or other means at selected sensor locations along the fiber.

While the configuration of fiber sensors 1310, 1320 and 1330 shown in FIGS. 13a, 13b and 13c respectively each have three longitudinal channels, FIGS. 13d, 13e and 13f show alternative configurations for fiber sensors 1340, 1350 and 1360 having four, five and six longitudinal channels respectively and still maintaining a configuration that functions to increase the confinement loss of the HOMs of the band reflection spectra by in this example maintaining a strut width to core ratio between 0.3-0.5. As would be appreciated, one or more of the channels of fiber sensors 1340, 1350 or 1360 may be open or exposed to facilitate the formation of sensor regions or alternatively one or more of the outer surface of the fiber sensor or the outer surface of a corresponding enclosed channel may be configured to be substantially planar over an extended area to assist the laser ablation of the core region to form the FBG if required.

Shown in FIG. 13g is the cross-sectional configuration or geometry of microstructured optical fiber sensor 1370 where in this embodiment the width of the intra-channel struts is approximately 0.5 of the core diameter (shown in dotted outline) and the strut length is reduced as compared to the earlier embodiments to approximately 3 times the core diameter. As can be seen in this example, the longitudinal channels have been flattened in the radial direction to reduce the strut length. This may be compared to the microstructure optical fiber sensors 1380 and 1390 shown in FIGS. 13h and 13i respectively which substantially maintain the ratio of the intra-channel strut width to the core diameter while increasing the strut length.

Figure 14:
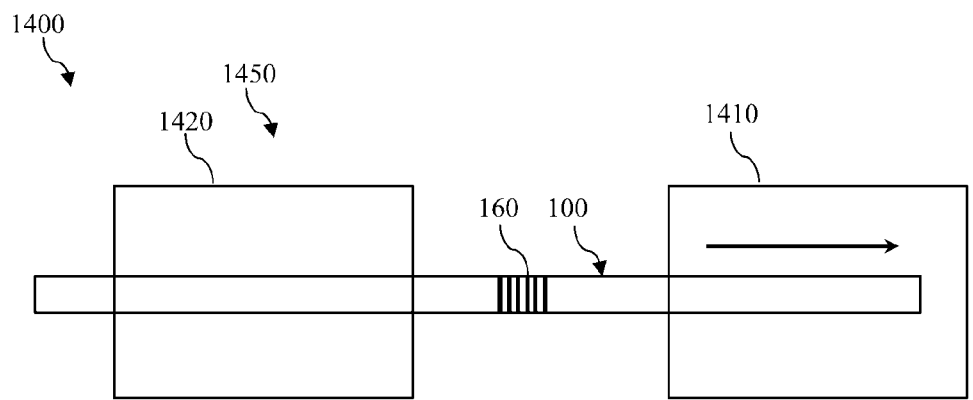
FIG. 14 is a figurative diagram of a strain measurement arrangement incorporating in this example the microstructured optical fiber sensor illustrated in FIG. 2 in accordance with an illustrative embodiment.

Referring now to FIG. 14, there is shown a figurative diagram of a strain measurement arrangement 1400 incorporating in this example the microstructured optical fiber sensor 100 illustrated in FIG. 2 according to an illustrative embodiment. Strain measurement arrangement 1400 functions to demonstrate the ability of fiber sensor 100 to measure applied strain and in this embodiment includes a motorized translation system 1450 having a moving component 1410 in the form of linear translation stage and non-moving component 1420 each mounted and fixed to fiber sensor 100 either side of FBG 160. In this example, strain is applied to fiber sensor 100 by moving the stages apart and observing the influence on the reflection signal originating from FBG or sensing region 160 which is located between the two mounting points.

Figure 15:
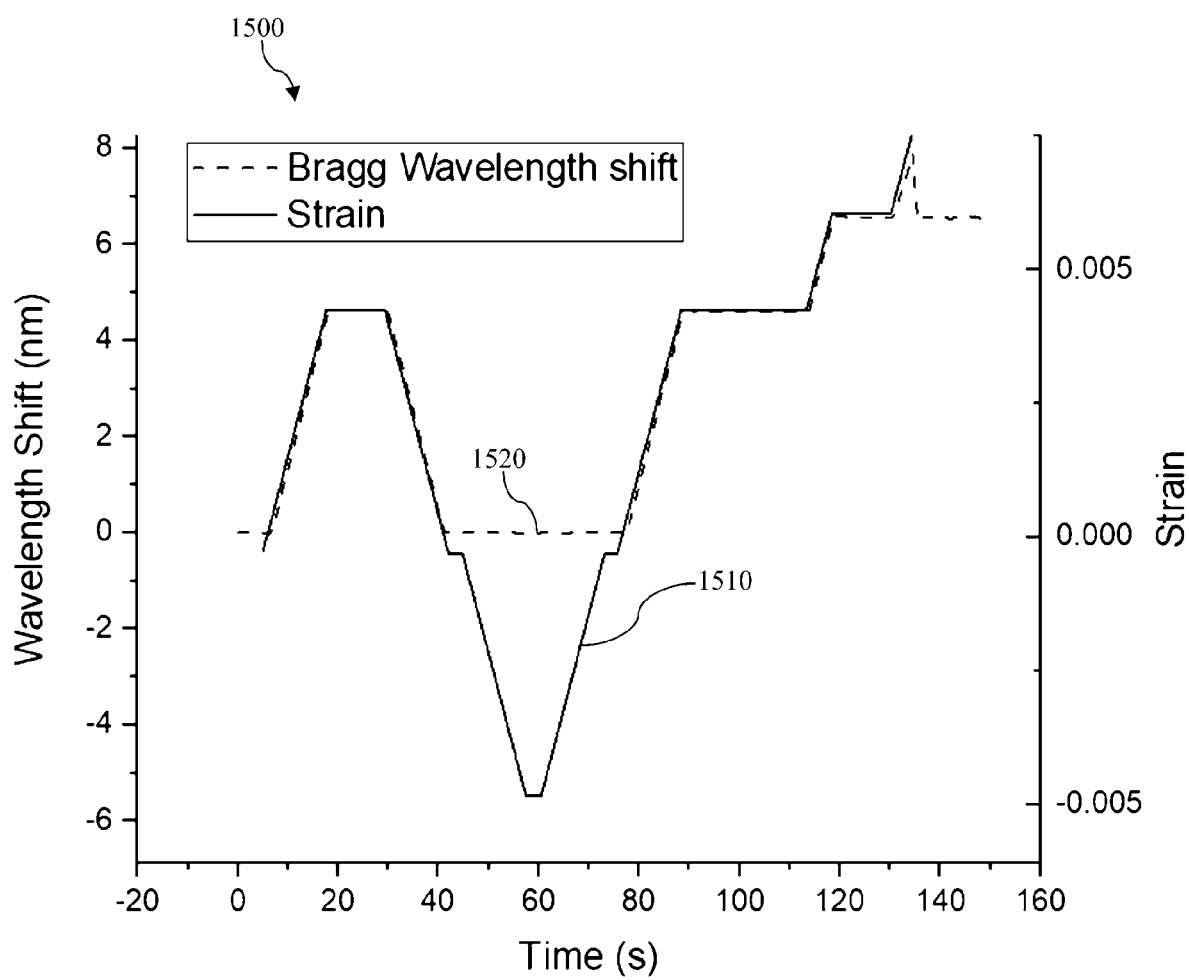
FIG. 15 is a plot of the wavelength shift of the band reflection spectra and the applied strain to the strain measurement arrangement illustrated in FIG. 14 as a function of time demonstrating the correspondence between the shift of the band reflection spectra and the strain applied to the sensing region in accordance with an illustrative embodiment.

Referring now to FIG. 15, there is shown a plot 1500 of the wavelength shift of the band reflection spectra 1520 of the microstructured optical fiber sensor 100 and the applied strain to the sensor 1510 as a function of time as determined by the strain measurement arrangement 1400 illustrated in FIG. 14. To demonstrate the wavelength shift 1520 of the band reflection spectra as a function of strain applied to the sensor 100, linear translation stage 1410 is moved in steps with a slow movement speed showing the shift in the fundamental mode of the Bragg reflection wavelength with the applied strain on the fiber sensor 100.

As shown in FIG. 15, the strain 1510, as calculated from the change in length divided by the overall fiber length, is indicated on the right vertical axis. As can be seen, the wavelength shift 1520 tracks the applied strain to the sensing region 160 of the fiber sensor 100 noting that the fiber is not sensitive to strain until it is under tension (ie, values of strain less than zero) with only a small shift seen at maximum negative deflection correlating to bending of the fiber of the fiber sensor 100. This is expected as FBGs are sensitive to strain applied to the fiber sensor based on the coefficient of strain $c_s$ (related to the strain optical coefficient $p_e$) so that applying a linear strain to the fiber sensor 100 results in a shift in the band reflection spectra and in the position of the band reflection spectra.

As would be appreciated, a microstructured optical fiber sensor that is configured in accordance with the present disclosure to increase the confinement loss of the HOMs will increase the performance of any sensor based on this configuration that senses changes in a physical characteristic based on a shift of the band reflection spectra, including, but not limited to a temperature sensor, strain sensor, pressure sensor, bending sensor or refractive index sensor.

For those sensor embodiments configured for high temperature environments, and in particular those that have been described with reference to the use of fused silica material, the sensor is capable of sensing physical characteristics in environments up to a maximum temperature of 1600° C. At this stage the softening of the silica material will begin to affect the behavior of the FBG. In further embodiments, other materials may be used depending on the expected maximum temperature of the environment in which sensing is to be carried out. Some of these materials and the associated maximum temperature include, but are not limited to, flame fused silica for environments up to a maximum temperature of 1660° C., electrically fused silica for environments up to maximum temperature of 1710° C. and sapphire crystal for environments up to a maximum temperature of 2030° C.

While the material that a microstructured optical fiber sensor in accordance with the present disclosure is formed from will provide an upper limit due to the softening of the material affecting the performance of the FBG, it will be appreciated that the sensor may be configured to meet a requirement for measuring in an environment up to at least a predetermined temperature. Accordingly, a microstructured optical fiber sensor in accordance with the present disclosure may be optimized for sensing changes in a physical characteristic operable in temperature environments up to at least: 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., 1000° C., 1025° C., 1050° C., 1075° C., 1100° C., 1125° C., 1150° C., 1175° C., 1200° C., 1225° C., 1250° C., 1275° C., 1300° C., 1325° C., 1350° C., 1375° C., 1400° C., 1425° C., 1450° C., 1475° C., 1500° C., 1525° C., 1550° C., 1575° C., 1600° C., 1625° C., 1650° C., 1675° C., 1700° C., 1725° C., 1750° C., 1775° C., 1800° C., 1825° C., 1850° C., 1875° C., 1900° C., 1925° C., 1950° C., 1975° C., 2000° C. or 2025° C., by suitable adoption of appropriate material and configuration of the microstructured optical fiber and FBG.

In other embodiments not necessarily directed to high temperature environments, these sensors would function at lower temperatures with gratings made using standard techniques but with the advantageous reduction of the effect of HOMs. In ambient environments it is common to use ultra-violet inscribed FBGs into photosensitive doped-core of a microstructured optical fiber. In a typical configuration, the microstructured optical fiber consists of a GeO doped silica core with a pure silica cladding. The core may also be doped with other materials such as boron to increase its photosensitivity. It may also be hydrogen loaded by placing the fiber in a hydrogen gas chamber at high pressure to increase the photosensitivity. FBGs are then inscribed using an ultraviolet light source, typically utilizing a phase mask, which creates a periodic modulation in the refractive index of the core of the fiber. As would be appreciated, both the doped-glass core of the fiber and the ultraviolet inscribed gratings are not suitable for high temperature environments due to dopant diffusion and thermal annealing of the gratings, respectively.

As would be appreciated, microstructured optical fiber sensors configured in accordance with the present disclosure improve the performance of these sensors by reducing the effect of HOMs to enhance the performance reliability of these sensors. In particular, microstructured optical fiber sensors configured in accordance with the principles of the present disclosure may be formed with a larger number of sensing locations for a given operating length of the fiber sensor. This can allow more precise characterization of the variability of the physical characteristic being sensed as a function of location. Furthermore, microstructured optical fiber sensors configured in accordance with the present disclosure may be optimized to provide effectively single mode behavior for a desired operating length that can range from very short (ie, less than 10 cm) or very long (ie, greater than 100 m). In the example of very long operating lengths, a long lead-in fiber before the FBG may be adopted so that these fiber sensors may be utilized in difficult to reach locations where the environmental temperature exceeds the operating limits of standard acrylate or polyimide coated fibers.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A microstructured optical fiber sensor operable up to a predetermined temperature for sensing changes in a physical characteristic, comprising:
 a microstructured optical fiber comprising:
 an inner suspended core;
 an outer jacket region;
 at least three longitudinal channels extending along the microstructured optical fiber;

intra-channel struts separating the at least three longitudinal channels and extending radially from the inner suspended core to the outer jacket region;
a fiber Bragg grating formed in the microstructured optical fiber by generating a periodic modulation in the refractive index along a core region of the suspended core, the fiber Bragg grating configured to produce a band reflection spectra comprising a fundamental mode and a plurality of higher order modes whose respective wavelengths vary in accordance with changes in the physical characteristic at the core region of the microstructured optical fiber, wherein the microstructured optical fiber is configured in operation to increase a confinement loss of the plurality of higher order modes of the band reflection spectra relative to the fundamental mode,
wherein the microstructured optical fiber sensor includes an interrogation end for measurement of the band reflection spectra and an operating length corresponding to the distance between a sensing location comprising the fiber Bragg grating and the interrogation end,
wherein the microstructured optical fiber sensor is configured to have a predetermined confinement loss of the plurality of higher order modes relative to the fundamental mode based on the operating length, and
wherein the predetermined confinement loss of the plurality of higher order modes of the band reflection spectra relative to the fundamental mode is selected to suppress the plurality of higher order modes to allow measurement only of the fundamental mode at the interrogation end.

2. The microstructured optical fiber sensor of claim 1, wherein the intra-channel struts have a corresponding strut width and the inner suspended core has a core diameter and wherein the microstructured optical fiber is configured to have the strut width between 0.25-0.5 times the core diameter.

3. The microstructured optical fiber sensor of claim 2, wherein the microstructured optical fiber is configured to have the strut width between 0.27-0.48 times the core diameter.

4. The microstructured optical fiber sensor of claim 3, wherein the microstructured optical fiber is configured to have the strut width between 0.29-0.45 times the core diameter.

5. The microstructured optical fiber sensor of claim 1, wherein the intra-channel struts have a corresponding strut length and wherein the microstructured optical fiber is configured to have the strut length at least greater than or equal to the core diameter.

6. The microstructured optical fiber sensor of claim 5, wherein the microstructured optical fiber is configured to have the strut length at least twice the core diameter.

7. The microstructured optical fiber sensor of claim 6, wherein the microstructured optical fiber is configured to have the strut length at least three times the core diameter.

8. The microstructured optical fiber sensor of claim 1, wherein the microstructured optical fiber sensor is further configured to have a fundamental node confinement loss of the fundamental mode over the operating length of less than a predetermined loss parameter and a suppression ratio comparing the loss of a first higher order mode to the fundamental mode over the operating length greater than a predetermined suppression ratio.

9. The microstructured optical fiber sensor of claim 8, wherein the predetermined loss parameter of the fundamental mode is less than 60 dB.

10. The microstructured optical fiber sensor of claim 8, wherein the predetermined suppression ratio is greater than 3.

11. The microstructured optical fiber sensor of claim 1, wherein a size of the suspended core is configured to be matched with a single mode fiber (SMF) carrier.

12. The microstructured optical fiber sensor of claim 1, wherein the physical characteristic is temperature.

13. The microstructured optical fiber sensor of claim 1, wherein the physical characteristic is strain.

14. The microstructured optical fiber sensor of claim 1, wherein the physical characteristic is pressure.

15. The microstructured optical fiber sensor of claim 1, wherein the periodic modulation in the refractive index along the core region is formed by laser ablating defects along the core region of the microstructured optical fiber.

16. The microstructured optical fiber sensor of claim 15, wherein the microstructured optical fiber is formed of silica material and the sensor is configured for a predetermined temperature of at least 700° C.

17. The microstructured optical fiber sensor of claim 15, wherein the microstructured optical fiber is formed of silica material and the sensor is configured for a predetermined temperature of at least 1000° C.

18. The microstructured optical fiber sensor of claim 15, wherein the microstructured optical fiber is formed of silica material and the sensor is configured for a predetermined temperature of at least 1350° C.

19. The microstructured optical fiber sensor of claim 15, wherein the microstructured optical fiber is formed of silica material and the sensor is configured for a predetermined temperature of at least 1550° C.

20. The microstructured optical fiber sensor of claim 15, wherein the microstructured optical fiber is formed of sapphire crystal and the sensor is configured for a predetermined temperature of at least 1600° C.

21. The microstructured optical fiber sensor of claim 15, wherein the microstructured optical fiber is formed of sapphire crystal and the sensor is configured for a predetermined temperature of at least 2000° C.

22. The microstructured optical fiber sensor according to claim 1, wherein the sensor includes a second fiber Bragg grating formed in the microstructured optical fiber by generating a periodic modulation in the refractive index along a second core region of the microstructured optical fiber, the second core region spaced from the core region of the fiber Bragg grating, wherein the second fiber Bragg grating is configured to produce a second band reflection spectra at different wavelengths to the band reflection spectra of the fiber Bragg grating, the second band reflection spectra comprising a second fundamental mode and a plurality of associated higher order modes, wherein the respective wavelengths of the second band reflection spectra vary in accordance with changes in the physical characteristic at the second core region of the microstructured optical fiber, wherein the microstructured optical fiber is configured in operation to increase a confinement loss of the plurality of associated higher order modes of the second band reflection spectra relative to the second fundamental mode.

23. A sensing system comprising:
a source of electromagnetic radiation;
a microstructured optical fiber sensor as claimed in claim 1, the microstructured optical fiber sensor interfaced to the source of electromagnetic radiation;

a detector for detecting the band reflection spectra from the core region of the microstructured optical fiber sensor where the fiber Bragg grating is located, the detector interfaced to the microstructured optical fiber sensor; and a data processor for determining a physical characteristic at the core region based on the shift of the fundamental mode of the band reflection spectra.

24. A multiplexed sensing system comprising:

a source of electromagnetic radiation;

a microstructured optical fiber sensor as claimed in claim 22, the microstructured optical fiber sensor interfaced to the source of electromagnetic radiation;

a detector for detecting the band reflection spectra from the core region where the fiber Bragg grating is located and the second band reflection spectra from the second core region where the second fiber Bragg grating is located, the detector interfaced to the microstructured optical fiber sensor; and a data processor for a physical characteristic at both the core region and the second core region of the microstructured optical fiber sensor based on the respective shifts of the fundamental mode of the band reflection spectra and the second fundamental mode of the second band reflection spectra.

* * * * *